July 18, 1967 TAKEO SEKI ET AL 3,332,025

NEGATIVE IMPEDANCE BRIDGE-TYPE FREQUENCY MODULATION RECEPTION SYSTEM

Filed May 15, 1963

INVENTORS
TAKEO SEKI
ICHIRO MIWA
BY Paul M. Craig, Jr.
ATTORNEY

United States Patent Office 3,332,025

Patented July 18, 1967

3,332,025

NEGATIVE IMPEDANCE BRIDGE - TYPE FREQUENCY MODULATION RECEPTION SYSTEM

Takeo Seki, Tokyo, and Ichiro Miwa, Hachioji-shi, Tokyo, Japan, assignors to Hitachi, Ltd., Tokyo, Japan, a corporation of Japan Filed May 15, 1963, Ser. No. 280,513
Claims priority, application Japan, May 21, 1962, 37/19,869
5 Claims. (Cl. 329—119)

It is well known that wide band frequency modulation systems provide an advantage of improved signal-to-noise ratio for communication lines by means of the wide band gain and noise supression. However an input signal level above a certain limit (threshold level) is required to obtain the above mentioned improvement in signal-to-noise ratio, and below level the noise suppression effect is nullified and noise increases abruptly.

The threshold level is proportional to the band width of a receiver assuming that other conditions are kept invaried. Therefore it would seem that one could obtain high sensitivity by using a narrow band. Since in such case, however, one must keep frequency deviation to a small amount from the standpoint of minimum distortion, wide band gain is reduced and hence signal-to-noise ratio over the receivable field is sacrificed. Thus improvement of the signal-to-noise ratio by wide band gain is incompatible with maintaining the threshold level required, and this has been an acknowledged weakness of frequency modulation communiction systems.

Figure 1:
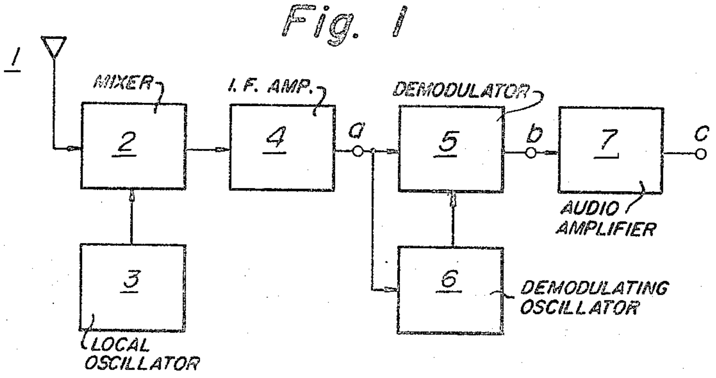
Figures 2, 3:
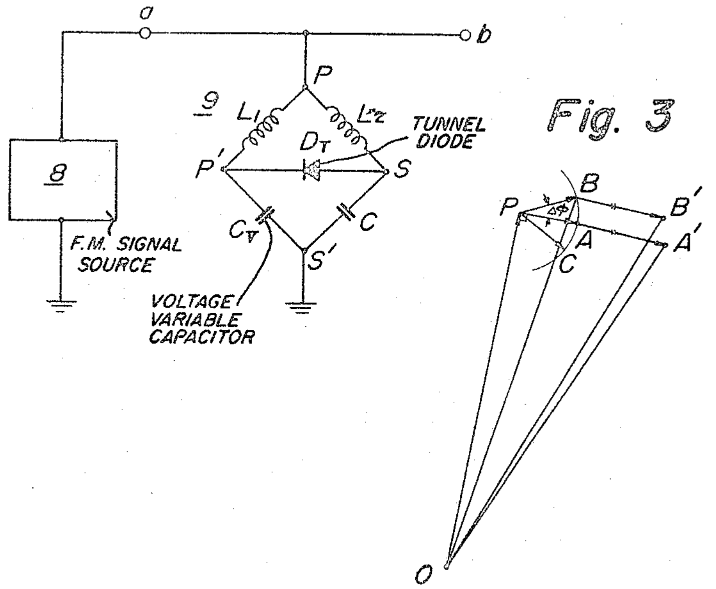

The present invention which obviates the above mentioned shortcoming of frequency modulation communication systems and receivers in particular will be clearly understood from the following description referring to the accompanying drawings which illustrate an embodiment there of and wherein:

FIG. 1 shows a block diagram of a frequency modulation receiving system according to the present invention; FIG. 2 shows a circuit illustrating one embodiment of an essential part of the invention; and FIG. 3 shows a vector diagram for explaining the present invention.

Referring to FIG. 1 which shows a block diagram illustrating a frequency modulation receiving system according to the present invention, received signal waves obtained through a receiving antenna 1 are converted into intermediate frequency wave by means of a frequency mixer section 2 and a local oscillator section 3, amplified appropriately in an intermediate frequency amplifier section 4. The intermediate frequency signal is then detected in a demodulator section 5 by means of interaction to be described later with output oscillation of a demodulating oscillator section 6, and the detected signal is taken out through an audio amplifier section 7*a*, *b* and *c* denote input and output terminals of the demodulator section 5, 6 and an output terminal of the receiver, respectively.

The demodulating oscillator section 6 is of a nature such that it varies the oscillation frequency thereof in one sense or other depending on whether the resultant voltage amplitude of the output voltage of the oscillation frequency signal of the section 6 and the input voltage of the received signal supplied from the output of the intermediate frequency amplifier section 4, is higher or lower than the amplitude of the original output voltage of the oscillation frequency signal of section 6.

Accordingly, when the output of the demodulating oscillation is sufficiently higher than the received signal waves in magnitude, if the received signal frequency is equal to the oscillation frequency of the demodulating oscillator 6 in the reference state, (for a case where they differ description will be made hereafter), as the phase of the received signal wave changes, the phase of the oscillation output changes also following the former change, and hence the oscillator 6 oscillates maintaining the phase interrelation at 90°.

The reason for this is as follows:

Considering a case where the received input is the same frequency of oscillator 6 and as the demodulation frequency is added to the output of the demodulating oscillator. The resultant voltage of the two signals changes so that it becomes higher than the output voltage of the oscillator and the oscillation frequency thereof accordingly is increased. Since the oscillation frequency of oscillator 6 is increased immediately after addition of the incoming received signal, the phase of the oscillation output from section 5 is advanced progressively by the received signal applied from outside, and the resultant (vector sum) of the amplitudes of the two high-frequency voltages decreases gradually. When their phase difference become approximately 90°, the vector sum of the two high frequency voltages is nearly equal to the amplitude of the oscillation frequency of oscillator section 6 if the oscillation frequency was returned to the original value.

Although in the above explanation the received signal frequency is assumed to be equal to the demodulating frequency for simplicity of description, it will be understood from the above description that when the demodulating frequency is $fo$ while the received signal frequency is $fo+\Delta f$, the phase shifts from 90° by a phase shift of $\Delta\phi$ corresponding to $\Delta f$ to $90°+\Delta\phi$ or $90°-\Delta\phi$.

Referring to FIG. 3, the operation of the demodulator will be explained for a case where the frequency deviation of the received input signal is sufficiently large and therefore the amplitude component of the noise is higher then the amplitude component of the received signal but its phase component is lower than the phase component of the signal.

In FIG. 3, if we represent by OP the amplitude of the demodulating oscillation output signal, the amplitude PA of the received signal is deviated in phase by $\pm\Delta\phi$, as shown at PB or PC, according to the frequency change as described above. Thus we can obtain the transmitted signal component by detecting this as the phase deviation is nearly proportionate to the frequency deviation of the demodulating output signal.

When the received signal becomes very faint, the noise level becomes considerably higher than that of the received signal, and communication would be impossible by means of conventional frequency wave demodulation schemes for the reason that the received signal would be below the threshold level. The resultant of noise amplitude AA′, the signal amplitude OP of the demodulating oscillation output and the received signal PA is represented by OA′, when the received signal is PA. Similarly when the received signal is PB, the phase component of the noise is lower than the received signal phase component and the resultant is represented by OB′. Since OA′ and OB′ are nearly proportionate in magnitude to the frequency deviation imposed on the received signal, the transmitted signal can be obtained by detecting it similarly as the above mentioned case where noise is lower than the received signal component.

Therefore, over a range where the noise level is lower than the demodulating oscillation level, the threshold phenomena cannot take place. This results from the fact that the received signal is lower than the noise level as was true in conventional frequency modulation receiving schemes. Yet with the system of the invention we can detect even a faint transmitted signal.

In FIG. 2 is shown a circuit diagram illustrating an embodiment of an essential part of the present invention, wherein numeral 8 represents in general a source of received frequency modulated signals functioning as from the antenna 1 to the intermediate frequency amplifier 4 in FIG. 1 and *a* and *b* correspond to the terminal *a* and *b*, respectively, in that figure. Numeral 9 represents a practical circuit which combines demodulator section 5 and demodulating oscillator section 6. In this circuit $C_v$ is a voltage variable nonlinear capacitor which may be of capacity either increasing as a well known variable capacity diode or decreasing as a ferroelectric capacitor, for example a barium titanate capacitor, with A.C. amplitude applied thereto. $L_1$ and $L_2$ are inductances and C is electrostatic capacity. A bridge circuit is formed with these elements as shown in the figure, and a bridge type oscillator circuit is formed by connecting a negative impedance, for example a well known tunnel diode $D_T$, between a pair of diagonal terminal P' and S. Assume that frequency modulated received signal input of the same frequency as the oscillating frequency of the circuit 9 is applied between another pair of diagonal terminals P and S' of the bridge type oscillator circuit from the source 8. This signal input is also applied to the variable capacitor $C_v$ so that the electrostatic capacity thereof varies resulting in change of oscillation frequency. An equilibrium state is attained and maintained thereafter as described above wherein the phase difference between the received signal input and oscillation output is approximately 90°. Furthermore, it is obvious that the phase difference is $90 \pm \Delta\phi$ when the frequency of the received signal differs from the oscillation frequency at the reference condition.

Thus the change in the frequency of frequency modulated received signal is converted into phase deviation $\Delta\phi$ of the demodulated oscillation voltage and into amplitude change of the total voltage which is a sum of the received signal voltage (including noise component) and oscillation voltage. By detecting the changes in the resultant total voltage even a faint signal can be detected.

Such a circuit 9 may be formed with not only a nonlinear capacitor C but a linear inductance L or a combination of nonlinear L and C.

Moreover, in this case, the circuit shown in FIG. 2 has the following advantages: First, since the instant circuit makes a bridge to be set up and the tunnel diode $D_T$ is connected between the pair of diagonal terminals between the intermediate sides, it is little affected by the external input. Therefore such a disadvantage as that the intensity of oscillation using nonlinearity of the diode $D_T$ being reduced by application of the frequency modulated, received signal input, is almost eliminated.

Furthermore, in the circuit shown in FIG. 2, since a voltage of Q-time that of the received signal voltage is applied across the variable capacity $C_v$ when the bridge circuit satisfies resonance condition, the variation of said $C_v$ can effectively be enlarged, and this is exceedingly useful for operation of the circuit 9.

As is obvious from the above explanation, the present invention has the remarkable effect that even faint received signals below normal threshold levels which heretofore have been generally difficult to receive with conventional frequency modulated wave systems, can be easily detected by means of a very simple circuit construction made aavilable by the invention.

While only certain preferred embodiments of the invention have been shown by way of illustration, it is apparent to those skilled in the art that many modifications and changes may be made therein. It is therefore to be understood that the appended claims are intended to cover all such modifications and changes as fall within the true spirit and scope of the invention.

What we claim is:

1. A frequency modulated signal reception apparatus comprising; receiving means for receiving a frequency modulated input signal wave; a bridge circuit forming a bridge type oscillation detector circuit, said bridge circuit having an oscillation frequency determining circuit including a voltage variable impedance element in one arm thereof, said bridge circuit also having negative impedance element connected across one diagonal thereof; and means for applying said frequency modulated input signal wave from said receiving means to said bridge circuit across the other diagonal thereof including the arm having the voltage variable impedance element as a part thereof for demodulating the frequency modulated input signal.

2. A frequency modulated signal reception apparatus as defined in claim 1 wherein said voltage variable impedance element is composed of a variable capacity diode.

3. A frequency modulated signal reception apparatus as defined in claim 1 wherein said voltage variable impedance element is composed of a ferroelectric capacitor.

4. A frequency modulated signal reception apparatus as defined in claim 2 wherein said negative impedance element is composed of a tunnel diode.

5. A frequency modulated signal reception apparatus as defined in claim 3 wherein said negative impedance element is composed of a tunnel diode.

References Cited

UNITED STATES PATENTS

| | | | |
|---|---|---|---|
| 2,881,312 | 4/1959 | Ressler | 329—133 X |
| 3,109,134 | 10/1963 | Indumi | 307—88.5 |
| 3,125,690 | 3/1964 | Kernick | 307—88.5 |
| 3,192,485 | 6/1965 | Watters | 331—107 |
| 3,202,899 | 8/1965 | Gambill et al. | 307—88.5 |
| 3,206,690 | 9/1965 | Watters et al. | 329—119 |

ROY LAKE, *Primary Examiner.*

ALFRED L. BRODY, NATHAN KAUFMAN, *Examiners.*